United States Patent
Funazaki et al.

(10) Patent No.: US 9,274,833 B2
(45) Date of Patent: Mar. 1, 2016

(54) TASK SCHEDULER, MICROPROCESSOR, AND TASK SCHEDULING METHOD

(71) Applicant: DENSO CORPORATION, Kariya, Aichi-pref. (JP)

(72) Inventors: Tomoyoshi Funazaki, Kariya (JP); Shinichirou Taguchi, Nagoya (JP); Hirofumi Yamamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 41 days.

(21) Appl. No.: 14/222,790

(22) Filed: Mar. 24, 2014

(65) Prior Publication Data

US 2014/0344818 A1 Nov. 20, 2014

(30) Foreign Application Priority Data

May 16, 2013 (JP) ................. 2013-104137

(51) Int. Cl.
*G06F 9/46* (2006.01)
*G06F 9/48* (2006.01)

(52) U.S. Cl.
CPC .................... *G06F 9/4881* (2013.01)

(58) Field of Classification Search
CPC ........................................................ G06F 9/46
See application file for complete search history.

(56) References Cited

U.S. PATENT DOCUMENTS

| 6,189,022 | B1 * | 2/2001 | Binns | 718/100 |
| 2002/0120661 | A1 * | 8/2002 | Binns et al. | 709/102 |
| 2005/0132038 | A1 | 6/2005 | Inoue et al. | |
| 2009/0307700 | A1 * | 12/2009 | Cazorla Almeida | 718/103 |
| 2012/0057191 | A1 * | 3/2012 | Gnanasambandam et al. | 358/1.15 |
| 2015/0026687 | A1 * | 1/2015 | Yim et al. | 718/102 |

FOREIGN PATENT DOCUMENTS

| JP | H5-250338 A | 9/1993 |
| JP | H9-319596 A | 12/1997 |
| JP | 2001-236236 A | 8/2001 |
| JP | 2004-070579 A | 3/2004 |

OTHER PUBLICATIONS

Office Action mailed Apr. 21, 2015 in the corresponding JP application No. 2013-104137 (and English translation).
Abbott et al., "Scheduling Real-time Transactions: a Performance Evaluation", Proceedings of the Fourteenth International Conference on Very Large Data Bases, Aug. 29-Sep. 1, 1988, pp. 1-12, Los Angeles, California.

(Continued)

*Primary Examiner* — Philip Wang
(74) *Attorney, Agent, or Firm* — Posz Law Group, PLC (57) ABSTRACT

A task scheduler scheduling running units to execute a plurality of tasks is provided. The task scheduler includes a time control portion having a common time to control a state of the plurality of tasks, and a task calculator calculating a slack disappearance time for each of the plurality of tasks. An arrival time of one of the plurality of tasks is defined as T. A deadline time representing when the one of the plurality of tasks is required to be completed is defined as D. A worst case execution time predicted to be required for a completion of the one of the plurality of tasks is defined as W. A current elapsed time is defined as C. The slack disappearance time is expressed by S=T+D−W+C. A task having an earliest slack disappearance time from among the plurality of tasks is scheduled to be preferentially executed.

13 Claims, 12 Drawing Sheets

(56) References Cited

OTHER PUBLICATIONS

Hwang et al., Least Slack Time Rate first: New Scheduling Algorithm for Multi-Processor Environment, International Conference on Complex, Intelligent and Software Intensive Systems (CISIS) 2010, pp. 806-811, Feb. 15-18, 2010.

Hwang et al., Least Slack Time Rate First: an Efficient Scheduling Algorithm for Pervasive Computing Environment, Journal of Universal Computer Science, vol. 17, No. 6 (2011), pp. 912-925.

Office Action mailed Jan. 5, 2016 in the corresponding JP application No. 2013-104137 (and English translation).

* cited by examiner

| TM | TSK 1 | | TSK 2 | | | TSK 3 | | RUN TSK |
|---|---|---|---|---|---|---|---|---|
| | SLACK DIS TM | RUN TM | SLACK DIS TM | RUN TM | | SLACK DIS TM | RUN TM | |
| 1 | 7 | 0 | BEFORE TSK 2 START | | | | 0 | TSK 1 |
| 2 | 8 | 1 | | | | | 0 | TSK 1 |
| 3 | 9 | 2 | | | | | 0 | TSK 1 |
| 4 | 10 | 3 | | | | | 0 | TSK 1 |
| 5 | 11 | 4 | | | | | 0 | TSK 1 |
| 6 | 12 | 5 | 9 | 0 | | 17 | 0 | TSK 2 ← NEW TSK ADDED |
| 7 | 12 | 5 | 10 | 1 | | 17 | 0 | TSK 2 |
| 8 | 12 | 5 | 11 | 2 | | 17 | 0 | TSK 2 |
| 9 | 12 | 5 | 12 | 3 | | 17 | 0 | TSK 2 ← TSKS SWITCHED |
| 10 | 12 | 6 | 13 | 4 | | 17 | 0 | TSK 1 |
| 11 | 13 | 6 | AFTER TSK 2 END | | | 17 | 0 | TSK 1 |
| 12 | 14 | 7 | | | | 17 | 0 | TSK 1 |
| 13 | AFTER TSK 1 END | | | | | 18 | 1 | TSK 3 |

FIG. 6C

|       | STARTUP T | DEADLINE D | WCET W |
|-------|-----------|------------|--------|
| TSK 1 | 1         | 13         | 7      |
| TSK 2 | 6         | 7          | 4      |
| TSK 3 | 1         | 20         | 4      |

| TM | TSK 1 SLACK TM | TSK 1 RUN TM | TSK 2 SLACK TM | TSK 2 RUN TM | TSK 3 SLACK TM | TSK 3 RUN TM | RUN TSK |
|---|---|---|---|---|---|---|---|
| 1 | 6 | 0 | BEFORE TSK 2 START | | 16 | 0 | TSK 1 |
| 2 | 6 | 1 | | | 15 | 0 | TSK 1 |
| 3 | 6 | 2 | | | 14 | 0 | TSK 1 |
| 4 | 6 | 3 | | | 13 | 0 | TSK 1 |
| 5 | 6 | 4 | | | 12 | 0 | TSK 1 |
| 6 | 6 | 5 | 3 | 0 | 11 | 0 | TSK 2 ← NEW TSK ADDED |
| 7 | 5 | 5 | 3 | 1 | 10 | 0 | TSK 2 |
| 8 | 4 | 5 | 3 | 2 | 9 | 0 | TSK 2 |
| 9 | 3 | 5 | 3 | 3 | 8 | 0 | TSK 2 ← TSKS SWITCHED |
| 10 | 2 | 5 | 3 | 4 | 7 | 0 | TSK 1 |
| 11 | 2 | 6 | AFTER TSK 2 END | | 6 | 0 | TSK 1 |
| 12 | 2 | 7 | | | 5 | 0 | TSK 1 |
| 13 | AFTER TSK 1 END | | | | 5 | 1 | TSK 3 |

TASK SCHEDULER, MICROPROCESSOR, AND TASK SCHEDULING METHOD

CROSS REFERENCE TO RELATED APPLICATION

This application is based on Japanese Patent Application No. 2013-104137 filed on May 16, 2013, the disclosure of which is incorporated herein by reference.

TECHNICAL FIELD

The present disclosure relates to a task scheduler, a microprocessor having the task scheduler, and a task scheduling method. The task scheduler schedules running units to execute multiple tasks that are more than a total number of the running units.

BACKGROUND

In a system processing multiple tasks, in order to meet a deadline time (corresponding to a time limit), the multiple tasks may be effectively scheduled, so that a processor core (hereinafter, referred to as a running unit) executes the multiple tasks. The deadline time is determined to each of the multiple tasks. For example, Non-patent document 1 discloses an algorithm by which a spare time (hereinafter, referred to as a slack time) calculated from a worst case execution time of each task and a residual running time is determined, and a scheduling is performed based on the slack time, so that utilization efficiency is improved.

In JP-A-2005-157955 (corresponding to US 2005/0132038 A1), a determination method to determine a task allocation to a processor is disclosed. A slack time for switching a task (or a thread) is used in the determination method. By using the slack time, the task allocation to the processor is determined on a simultaneous multithreading (SMT). In addition, in a method of JP-A-2001-236236, an arrival time of a task is determined by the slack time, so that the number of times of a task switching is reduced and efficiency is improved.

However, the inventors of the present application have found the following difficulties.

A technology disclosed in JP-A-2005-157955 obtains the slack time from the processor by an interruption, and therefore, a real-time process performance may be deteriorated due to a deterioration of the utilization efficiency of the processor. In JP-A-2001-236236, a counter value of each of the tasks in a task information table is subtracted and updated. Therefore, the number of counters and a calculation of a slack time are increased proportionally to the number of the tasks. When an actual circuit area is considered, implementation may be difficult. Priority indicators of the tasks are compared with referring to the task information table, and a task having the largest priority indicator value is selected. Thus, a time required for the comparison increases proportionally to the number of the tasks, and therefore, it may be difficult to schedule the tasks in an actual processing time. Similar difficulties may occur in the technology disclosed in Non-patent document 1.

(Non-patent document 1) M. Hwang, et. al., "Least Slack Time Rate First: New Scheduling Algorithm for Multi-Processor Environment", International Conference on Complex, Intelligent and Software Intensive Systems (CISIS) 2010, pp. 806-811, 15-18 Feb. 2010

SUMMARY

It is an object of the present disclosure to provide a task scheduler, a microprocessor, and a task scheduling method, in order to schedule tasks in an actual processing time in a relatively small circuit area without deterioration of a real-time process performance.

According to an aspect of the present disclosure, a task scheduler scheduling running units to execute a plurality of tasks is provided. A total number of the plurality of tasks is greater than a total number of the running units. The task scheduler includes a time control portion having a common time to control a state of the plurality of tasks, and a task calculator calculating a slack disappearance time for each of the plurality of tasks. An arrival time of one of the plurality of tasks is defined as T. A deadline time representing when the one of the plurality of tasks is required to be completed is defined as D. A worst case execution time predicted to be required for a completion of the one of the plurality of tasks is defined as W. A current elapsed time is defined as C. The slack disappearance time is expressed by $S=T+D-W+C$. A task having an earliest slack disappearance time from among the plurality of tasks is scheduled to be preferentially executed.

According to another aspect of the present disclosure, a microprocessor including one or more running units and the task scheduler scheduling a running unit to execute multiple tasks is provided.

According to another aspect of the present disclosure, a task scheduling method scheduling a running unit to execute multiple tasks is provided.

According to the task scheduler, the microprocessor, and the task scheduling method, scheduling of tasks may be performed in an actual processing time in a relatively small circuit area without deterioration of real-time process performance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

In the present embodiment, a scheduling is performed based on a disappearance of a spare time (hereinafter, referred to as a slack disappearance time). The slack disappearance time is delayed while a task is executed. The slack disappearance time S is represented by the following expression:

$$S = T + D - W + C \qquad \text{(expression 1)}.$$

"T" corresponds to a task arrival time (also, referred to as a task startup time). "D" corresponds to a deadline time (i.e., a time when a task running needs to be completed). "W" corresponds to a worst case execution time (i.e., a time period predicted to be required until a completion of the task running). "C" corresponds to a current elapsed time. The current elapsed time represents an elapsed time at a current time. Therefore, the slack disappearance time corresponds to a time when the slack time related to the task running disappears or ends. The slack time is used in the conventional task scheduling.

Figure 4:
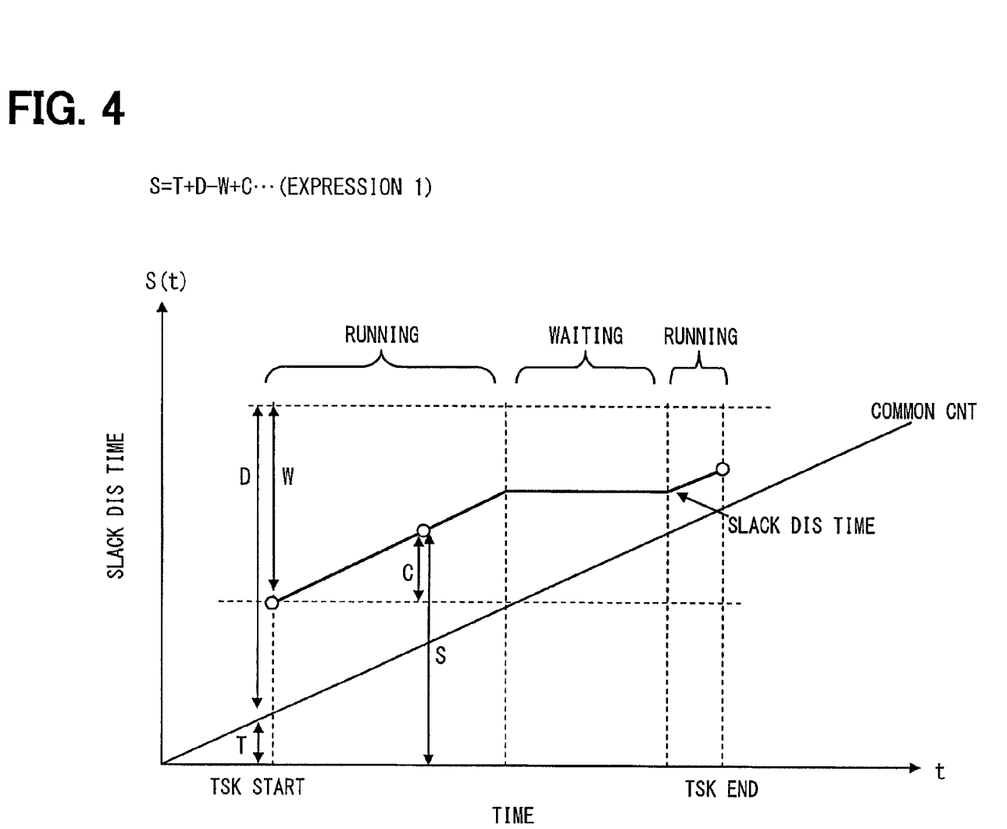
FIG. 4 is a diagram illustrating a slack disappearance time.

As described in FIG. 4, the slack disappearance time S is delayed when the task is executed. The slack disappearance time S does not change while the task is not executed, that is, in a waiting state as a waiting task. In other words, only the slack disappearance time S of the task, which is executed (corresponding to a running state), is updated. The slack disappearance time Si for a new task, which has not yet been executed, is represented by the following expression 2. C of the new task is equal to zero, and therefore, the slack disappearance time Si corresponds to:

$$Si = T + D - W \qquad \text{(expression 2)}.$$

Figure 5:
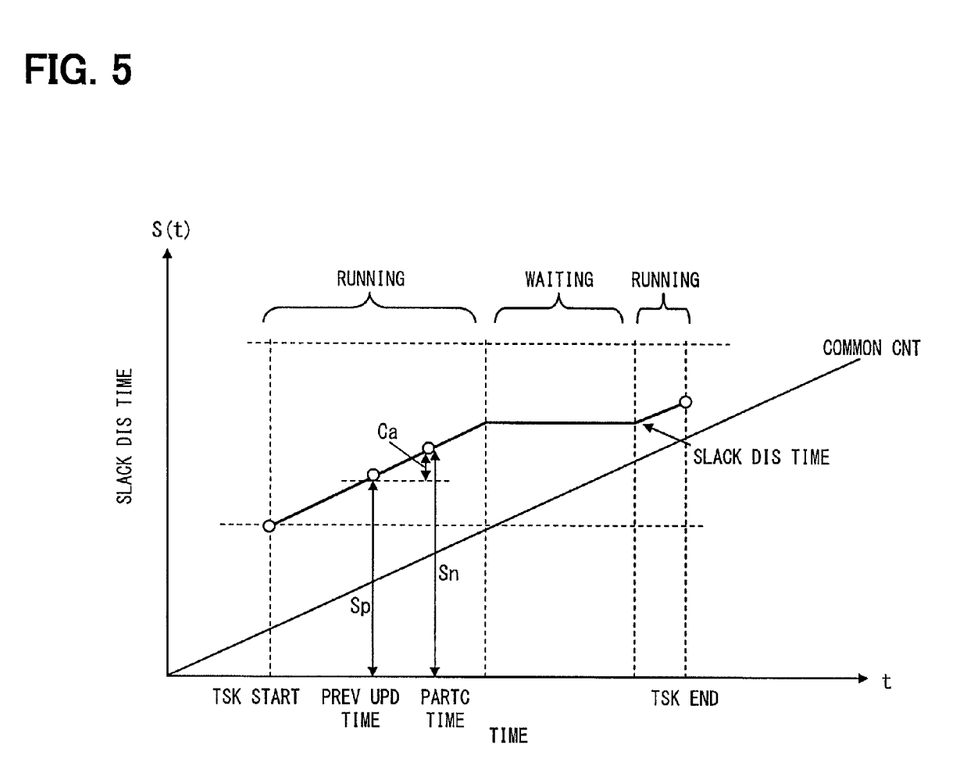
FIG. 5 is a diagram illustrating a running task corresponding to FIG. 4.

The slack disappearance time of the running task which has been executed at a specific time is defined as Sn. The slack disappearance time which has been updated in an earlier time before the specific time is defined as Sp. A current elapsed time counted from the earlier time to the specific time is defined as Ca. As described in FIG. 5, the slack disappearance time Sn is described as:

$$Sn = Sp + Ca \qquad \text{(expression 3)}.$$

In the present embodiment, the slack disappearance times S for the tasks are calculated, and a task having the earliest slack disappearance time S at each time is given a priority and is scheduled to be performed. A configuration will be explained as follows.

Figure 1:
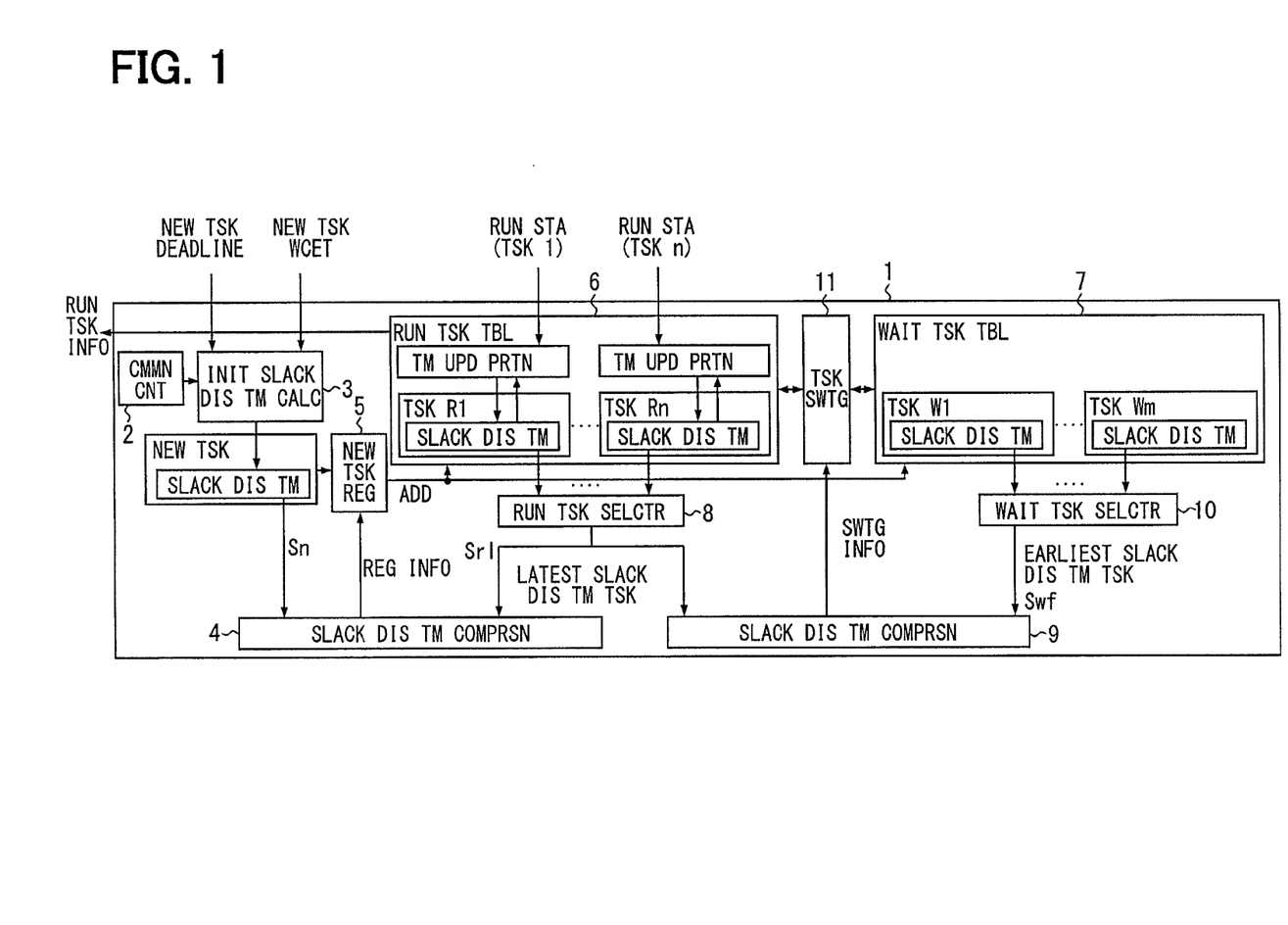
FIG. 1 is a diagram illustrating a functional block schematically representing a configuration of a task scheduler of a first embodiment.

As described in FIG. 1, a task scheduler 1 includes one common counter 2 controlling a time and being used for the task scheduling. The task scheduler 1 controls a time with respect to all tasks by using the common counter 2. When a new task occurs (corresponding to "YES" at S1 in FIG. 2), the slack disappearance time Si about the new task is calculated by an initial slack disappearance time calculator 3 (at S2). The slack disappearance time Si is inputted to a slack disappearance time comparison portion 4 and a new task register 5.

The common counter 2 in the present embodiment corresponds to a time control portion. The initial slack disappearance time calculator 3 receives a deadline time of the new task, and a worst case execution time of the new task (referring to FIG. 1).

In addition, the task scheduler 1 includes a running task table 6 and a waiting task table 7. Running tasks, which are in the running state, are described as running tasks R1 to Rn. The running task table 6 controls slack disappearance times Sr, which are calculated for the running tasks R1 to Rn. Waiting tasks, which are in the waiting state, are described as waiting tasks W1 to Wm. The waiting task table 7 controls a slack disappearance time Sw, corresponding to each of the waiting tasks W1 to Wm. A running task selector 8 selects a task having the latest slack disappearance time Srl from the running task table 6. The task having the latest slack disappearance time corresponds to a latest slack disappearance time task. The running task selector 8 inputs a latest slack disappearance time Srl of the latest slack disappearance time task into the slack disappearance time comparison portions 4, 9. The waiting task selector 10 selects a task having the earliest slack disappearance time Swf from the waiting task table 7. The task having the earliest slack disappearance time corresponds to an earliest slack disappearance time task. The waiting task selector 10 inputs a slack disappearance time Swf of the earliest slack disappearance time task into the slack disappearance time comparison portion 9.

Incidentally, each of the initial slack disappearance time calculator 3 and the running task table 6 corresponds to a task calculator in the present disclosure. The running task table 6 includes a time update portion. The time update portion corresponding to each of the running tasks R1 to Rn receives a corresponding running state from the external portion. The running task table 6 outputs running task information to the external portion (referring to FIG. 1).

Figure 2:
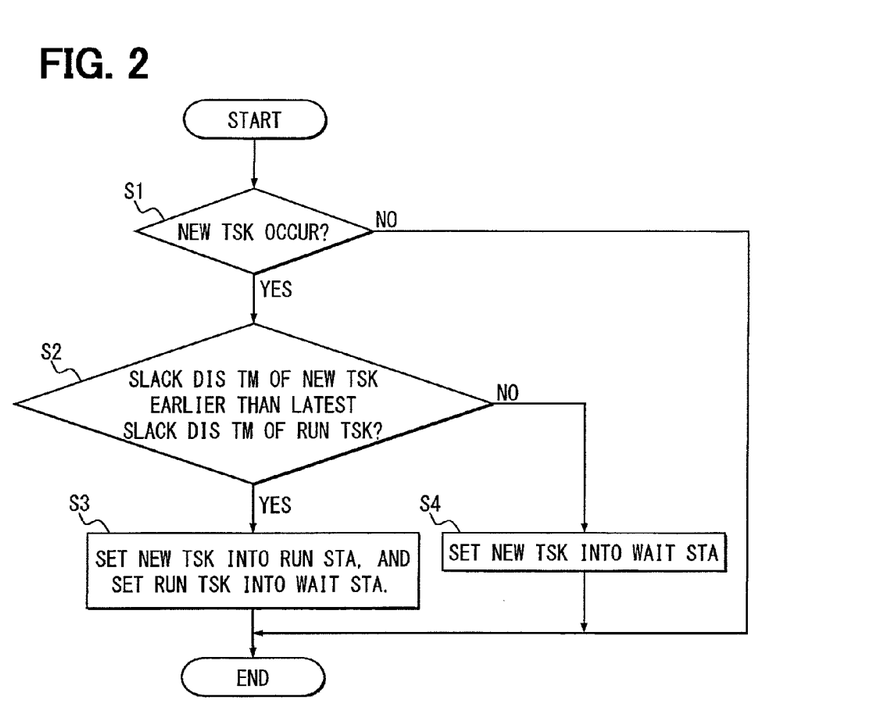
FIG. 2 is a flowchart illustrating a process of the task scheduler.

The slack disappearance time comparison portion 4 compares the slack disappearance time Sn of the new task and the latest slack disappearance time Srl of the running task (at S2). The slack disappearance time comparison portion 4 outputs registering information, based on a comparison result, to the new task register 5. Thus, when the slack disappearance time Sn is earlier than the latest slack disappearance time Srl (corresponding to "YES" at S2), the new task is registered to the running task table 6 to be controlled and be in a running state, and instead, the running task having the latest slack disappearance time Srl is registered to the waiting task table 7 to be controlled and be in a waiting state (at S3). When the slack disappearance time Sn of the new task is later than the latest slack disappearance time Srl, the new task is registered to the waiting task table 7 to be controlled (at S4).

The slack disappearance time comparison portion 9 compares the latest slack disappearance time Srl of the running tasks and the earliest slack disappearance time Swf of the waiting tasks. The slack disappearance time comparison portion 9 outputs a comparison result (corresponding to switching information) to a task switching 11. When the latest slack disappearance time Srl of the running tasks is later than the earliest slack disappearance time Swf of the waiting tasks, the running task of the latest slack disappearance time Srl is switched to a waiting task, which is controlled by the waiting task table 7, and instead the waiting task of the earliest slack disappearance time Swf is switched to a running task, which is controlled by the running task table 6. Thus, the running task is swapped for the waiting task.

Figure 3A:
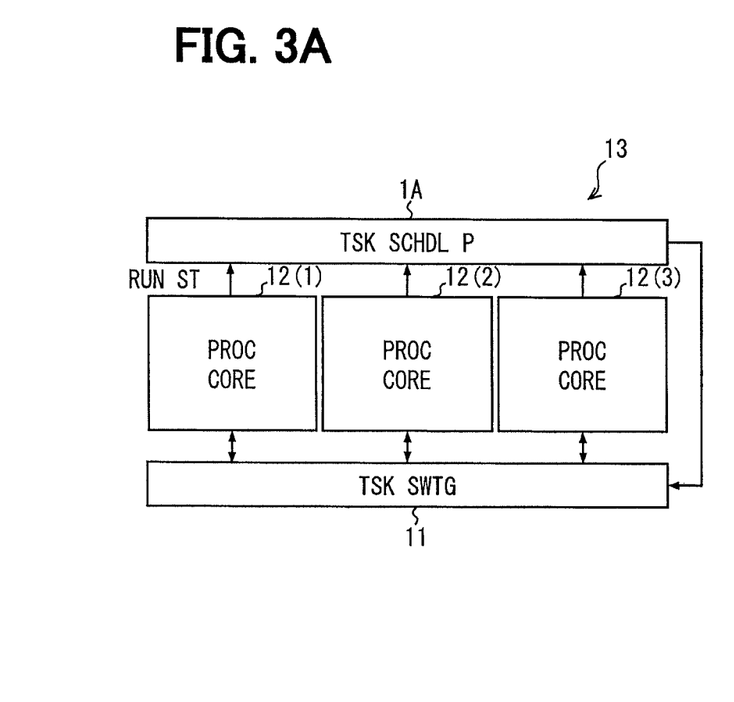
FIG. 3A is a diagram illustrating an exemplary embodiment of the task scheduler of the present embodiment applied to a microprocessor.
Figure 3B:
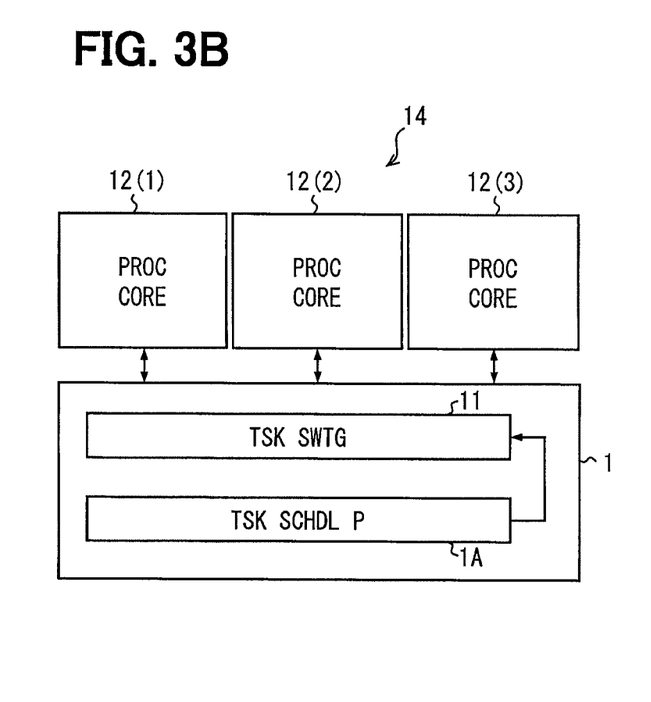
FIG. 3B is a diagram illustrating another exemplary embodiment of the task scheduler of the present embodiment applied to a microprocessor.

As described in FIG. 3A and FIG. 3B, when the task scheduler 1 is applied to a system mounting three processor cores 12 (1) to 12 (3) (corresponding to three running units), there may be two cases regarding a configuration of the task scheduler 1. In one case, as described in FIG. 3A, the task switching 11 in the microprocessor 13 is separated to a task scheduling part 1A and the task scheduler 1. In this case, the task scheduling part 1A corresponds to a part of the task scheduler 1 other than the task switching 11, In the other case, as described in FIG. 3B, the task switching 11 and the task scheduling part 1A are not separated, and the task scheduler 1 is provided integrally in the microprocessor 14. Incidentally, when the task scheduler 1 is applied to the microprocessors 13, 14, the top three tasks having the earliest slack disappearance time may be selected, and each of the processor cores 12 (1) to 12 (3) may execute the three tasks.

Figure 6A:
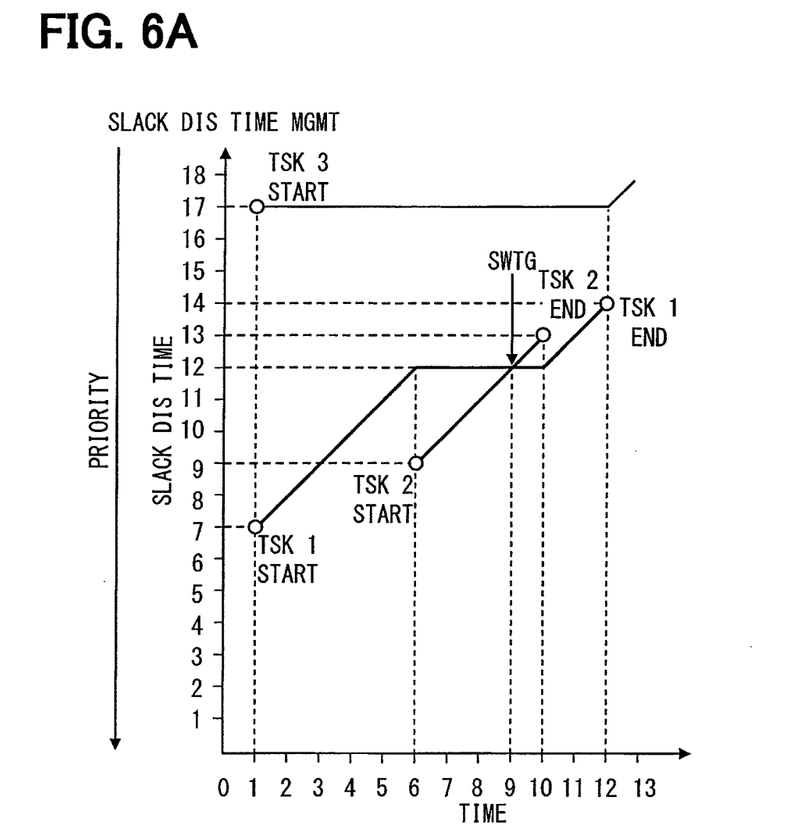
FIG. 6A is a diagram illustrating an example of the task scheduling of the present embodiment.
Figure 6B:
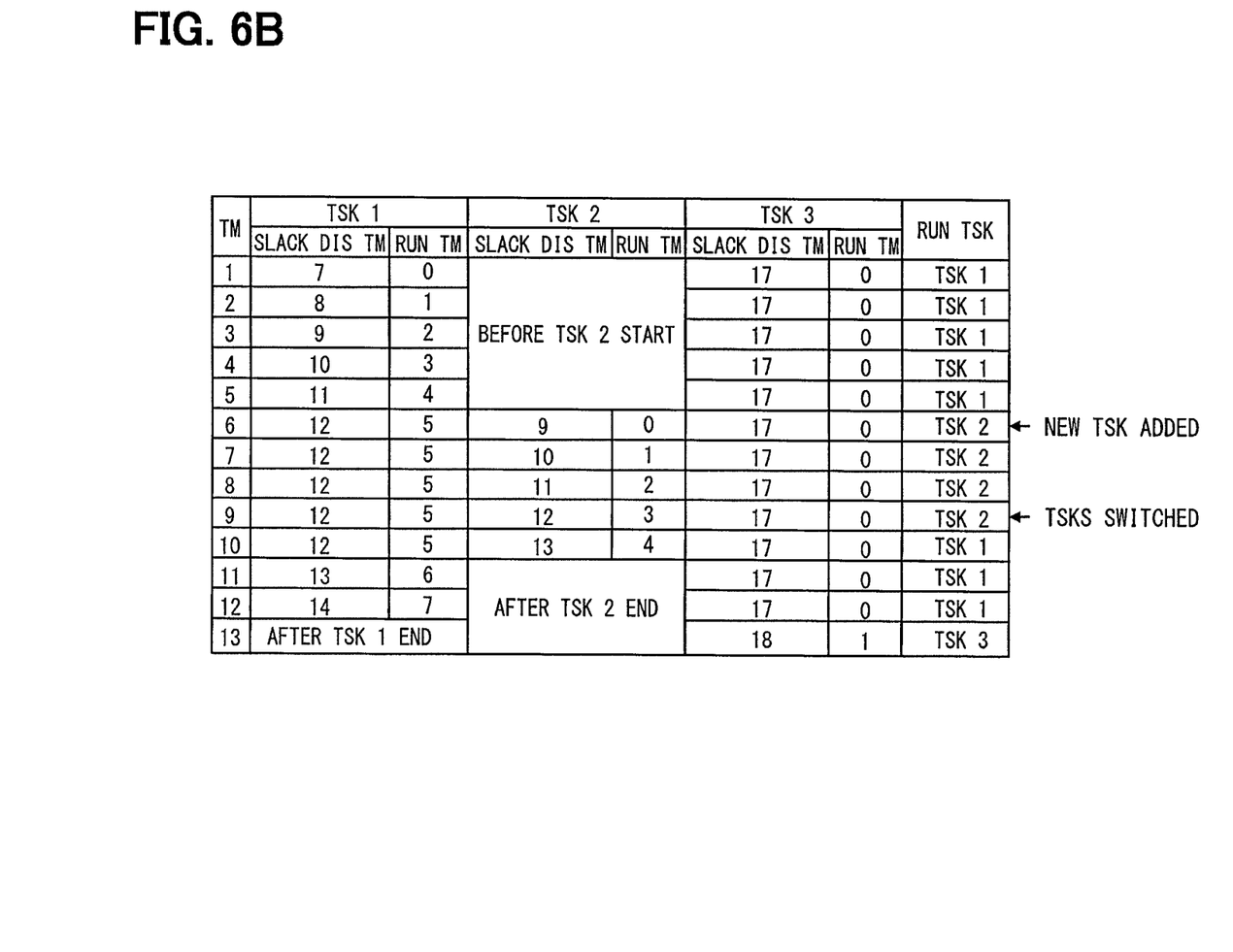
FIG. 6B is a diagram illustrating the example of the task scheduling described in FIG. 6A.
Figure 6C:
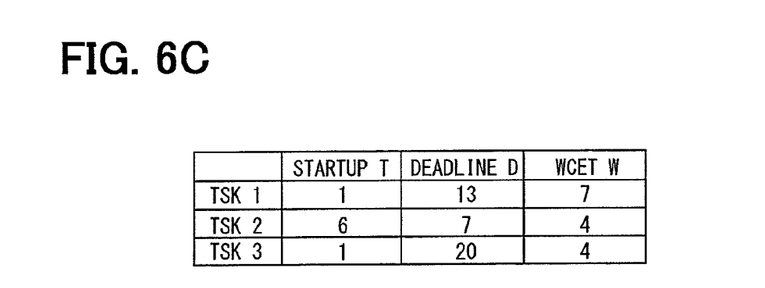
FIG. 6C is a drawing illustrating running information of the tasks described in FIG. 6A.

FIG. 6A and FIG. 6B illustrate an example of a scheduling (corresponding to a slack disappearance time control or a slack disappearance time management) in a case where three tasks 1 to 3 are started up. Running information of each of the three tasks 1 to 3 is described in FIG. 6C. At a time "1", the slack disappearance time of the task 1 corresponds to "7", and the slack disappearance time of the task 3 corresponds to "17". Therefore, the task 1 becomes the running task and the task 3 becomes the waiting task. The current elapsed time C of the task 1 increases as the task 1 is executed, and as a result, the slack disappearance time of the task 1 is delayed by the increase. The slack disappearance time of the task 3 remains "17". At a time "6", the task 2 is started up as a new task. The slack disappearance time of the task 2 at the time "6" corresponds to "9". Therefore, the task 1 is switched to the waiting task, and the task 2 becomes the running task. Thus, only the slack disappearance time of the running task changes.

At a time "10" when the running of the task 2 has been complete, the slack disappearance time of the task 1 corresponds to "12", and the slack disappearance time of the task 3 corresponds to "17". Since the slack disappearance time of the task 1 is earlier than the slack disappearance time of the task 3, the running of the task 1 is restarted. At a time "12" when the running of the task 1 has been completed, the running of the task 3 is started.

As follows, an example of a conventional task scheduling is described with referring to FIG. 7A and FIG. 7B.

Figure 7A:
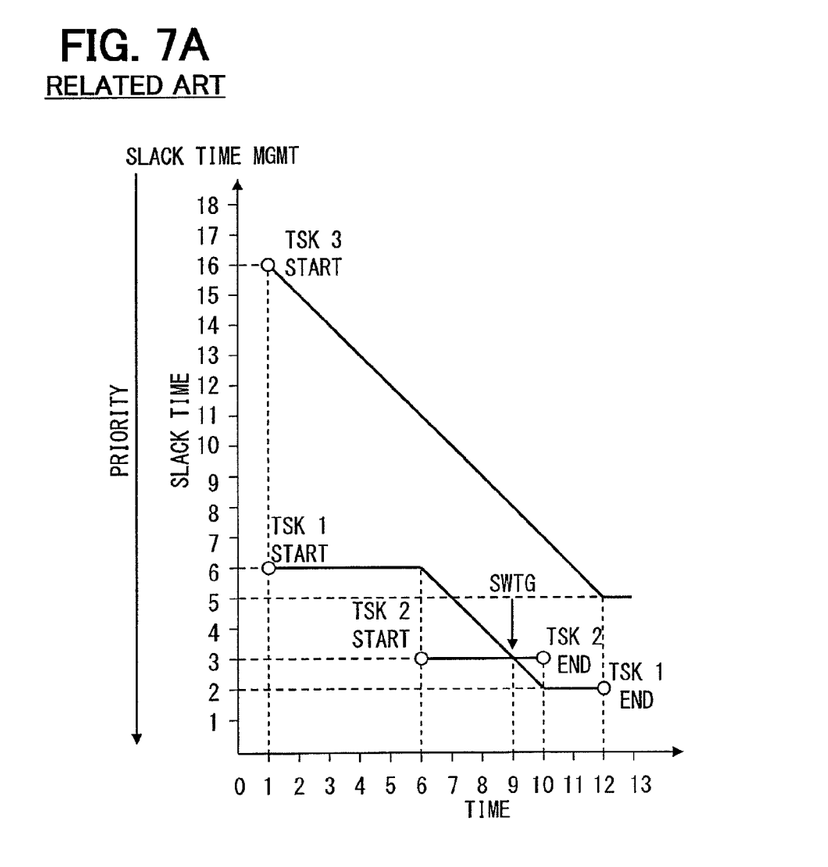
FIG. 7A is a diagram illustrating a comparative example of a conventional task scheduling corresponding to FIG. 6A.
Figure 7B:
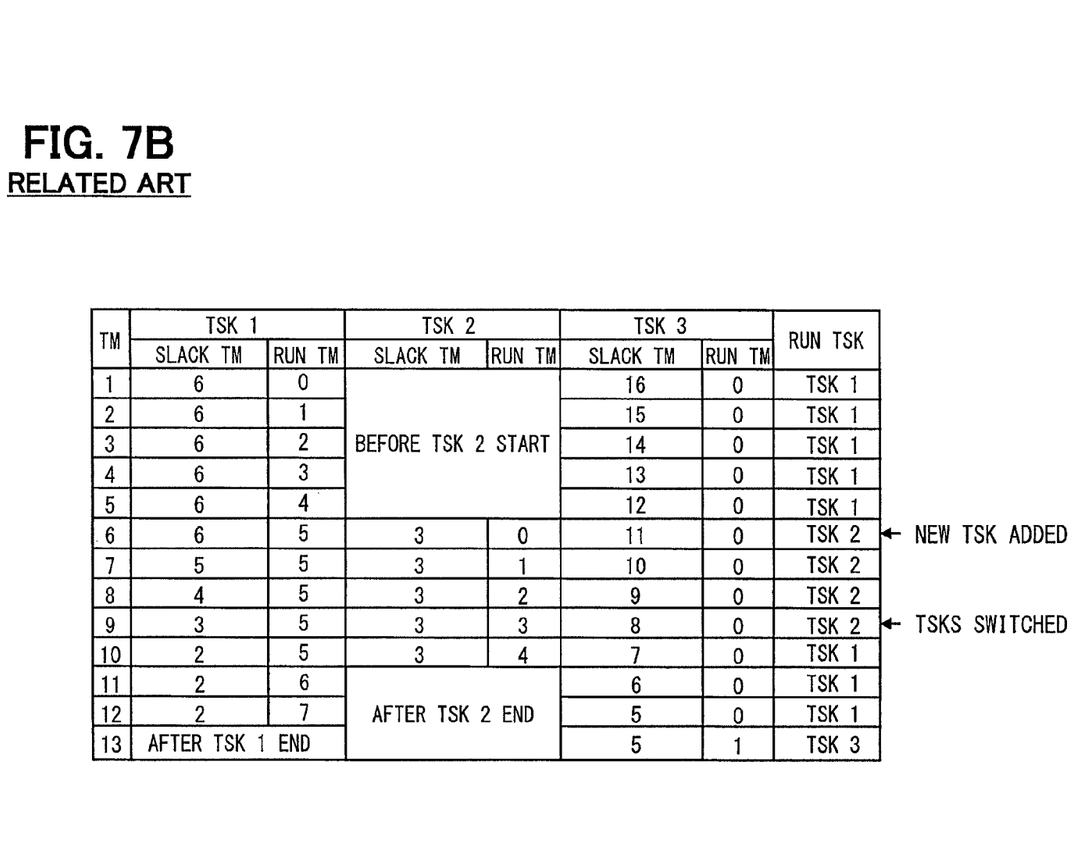
FIG. 7B is a diagram illustrating the comparative example of the task scheduling described in FIG. 7A.

FIG. 7A and FIG. 7B illustrate an example of the conventional task scheduling using a slack time with regard to the same tasks 1 to 3 in FIG. 6. The slack time of the task 1, which is executed from an arrival time, does not change. The slack time of the task 1 keeps having an initial value of "6". The slack time of the task 3, which has not been executed from the arrival time, changes at all times. The slack time of the task 3 is reduced as the time passes as described in FIG. 7B. The slack time of the waiting tasks changes. Therefore, even when the task having the least slack time is preferentially executed based on the conventional task scheduling, a priority order of a running of the tasks is similar to the priority order realized by the present disclosure.

Figure 8:
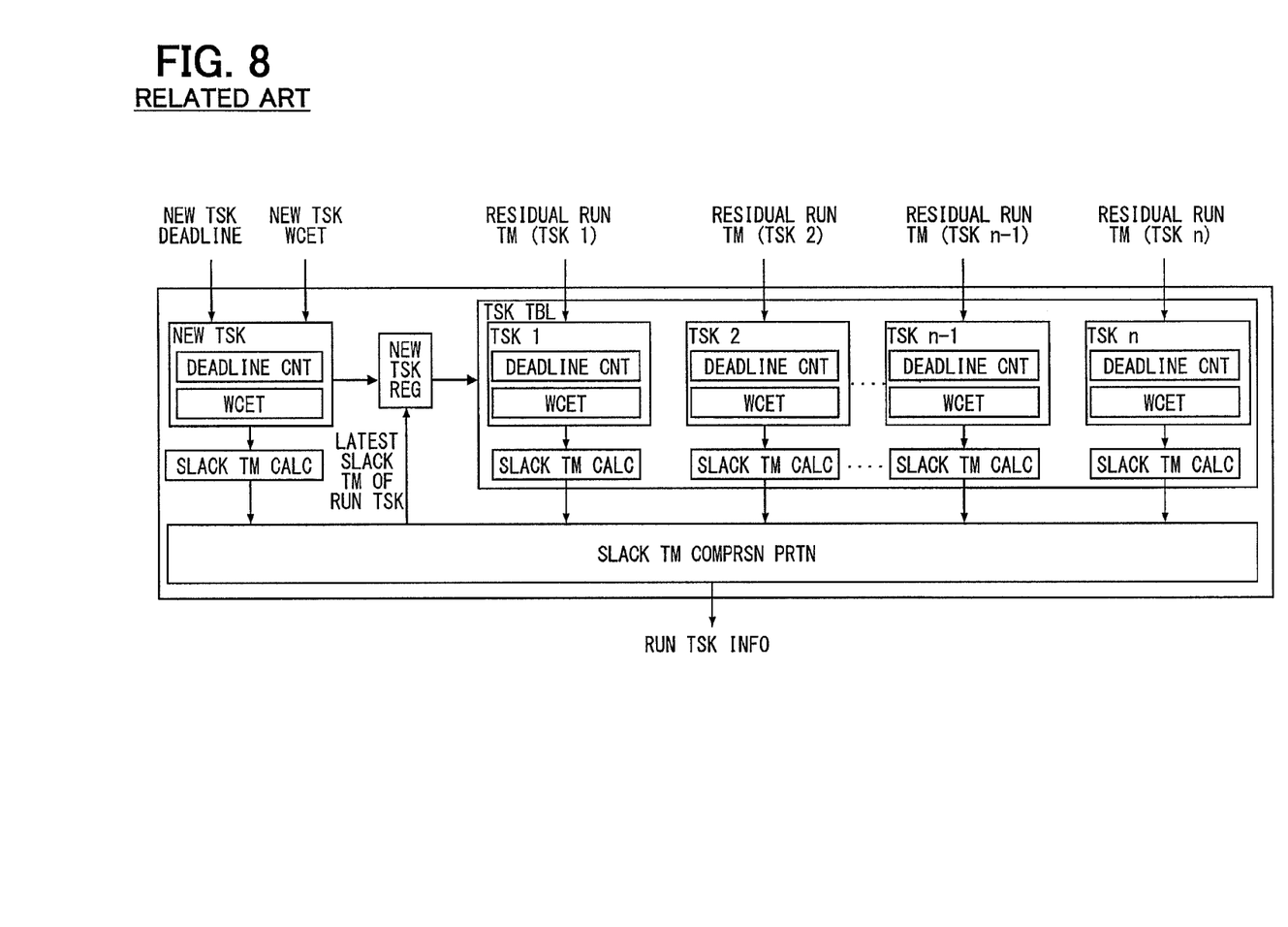
FIG. 8 is a diagram illustrating a comparative configuration corresponding to FIG. 7A and FIG. 7B.

In the conventional task scheduling in FIG. 8, counters (corresponding to deadline counters) and slack time calculation devices are prepared for all tasks. the slack time of a new task and each of the slack times of all tasks are compared when the new task is occurred. On the contrary, the task scheduler 1 in the present embodiment may have only one common counter 2. Furthermore, the task scheduler 1 in the present embodiment may perform a comparison between the slack times in the slack disappearance time comparison portions 4, 9.

As described above, according to the present embodiment, the task scheduler 1 controls running states of the multiple tasks based on a time measured by the common counter 2. The task scheduler 1 calculates the slack disappearance time S of each of the tasks according to the expression 1. The task scheduler 1 causes the task having the earliest slack disappearance time S to be executed preferentially. Therefore, only the slack disappearance time S of the running task may be updated. Thus, a deterioration of a real-time process performance may be prevented, and the task scheduler may be realized in a small scale circuit. Since the slack disappearance time Si of the new task is calculated by the expression 2 and the slack disappearance time Sn of the running task is calculated by the expression 3, the slack disappearance time S may be quickly calculated.

When the slack disappearance time of the new task is earlier than the latest slack disappearance time of the running tasks, the new task is assigned to the running task (in other words, is in the running state), and the running task having the latest slack disappearance time switches to the waiting task (in other words, be in the waiting state). Therefore, the running task and the waiting task may be switched with each other based on a time order of the slack disappearance times. That is, the new task is executed and the running task having the latest slack disappearance time switches from the running state to the waiting state when a slack disappearance time of the new task is earlier than the latest slack disappearance time of the first running task, and the new task is in the waiting state when the slack disappearance time of the new task is later than the latest slack disappearance time of the first running task. Since the slack disappearance time of the new task and the latest slack disappearance time of the running tasks are compared only once before the running task and the waiting task are switched with each other, the task scheduling may be performed quickly. The running task is controlled by the running task table 6. The waiting task is controlled by the waiting task table 7. That is, the running task and the waiting task are separately controlled by the running task table 6 and the waiting task table 7, respectively. As a result, the times of the running task and the waiting task may be easily compared for the switching. Incidentally, herein a managing by a task table may denote that In addition, the task scheduler 1 compares the running task having the latest slack disappearance time and the waiting task having the earliest slack disappearance time. When the earliest slack disappearance time of the waiting task is earlier than the latest slack disappearance time of the running task, the running task with the latest slack disappearance time switches to the waiting task, and instead, the waiting task having the earliest slack disappearance time switches to the running task. In this case, since the latest slack disappearance time of the running task and the earliest slack disappearance time of the waiting task are compared only once before the running task and the waiting task are switched with each other, the task scheduling may be performed quickly. In a case where the microprocessors 13, 14 are configured to include the task scheduler 1, a smaller microprocessor may be used. Alternatively, a smaller microprocessor may be used.

(Second Embodiment)

Figure 9:
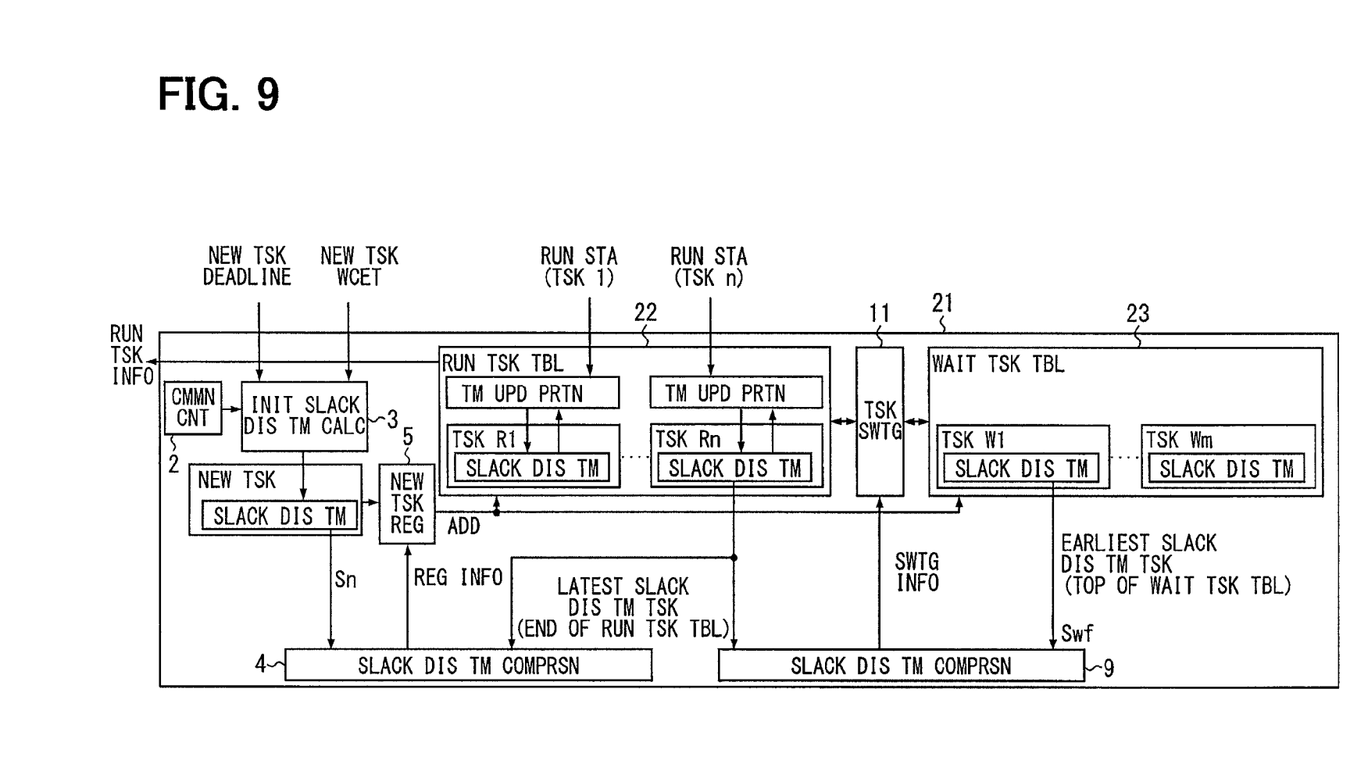
FIG. 9 is a diagram illustrating a functional block schematically representing a configuration of a task scheduler of a second embodiment.

Followingly, identical parts or similar parts to the first embodiment are denoted by the same symbols, and a description will be omitted. Only those parts that are different from the first embodiment will be explained. As described in FIG. 9, in a task scheduler 21 of the second embodiment, the running task selector 8 and the waiting task selector 10 are removed. Instead, a running task table 22 and a waiting task table 23 respectively continuously sort the time order of the slack disappearance time of the running task and the waiting task.

Figure 10:
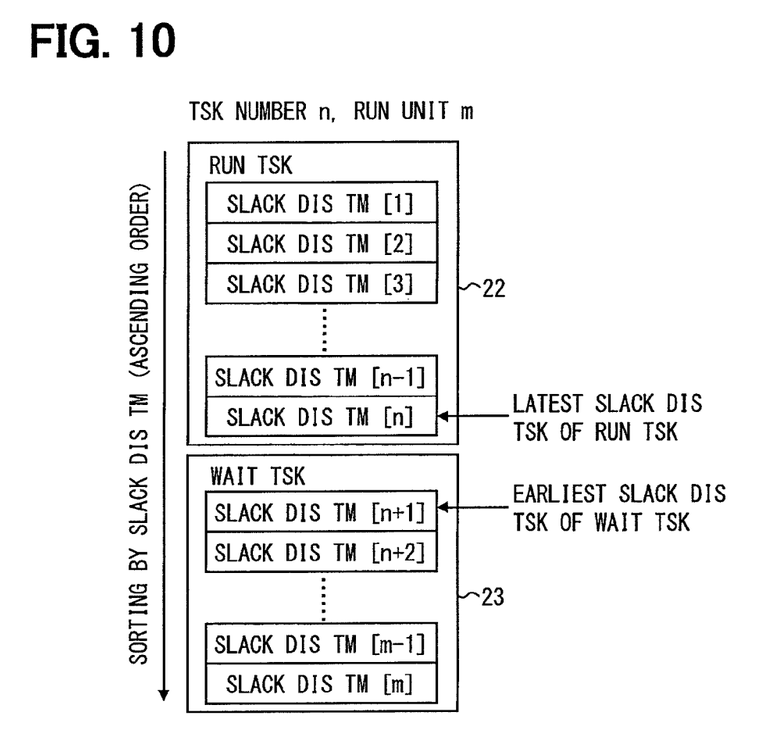
FIG. 10 is a diagram illustrating a concept to sort the slack disappearance time.

The running task table 22 outputs the task having the latest slack disappearance time to the slack disappearance time comparison portions 4, 9. The waiting task table 23 outputs the task having the earliest slack disappearance time to the slack disappearance time comparison portion 9 (referring to FIG. 10). Thus, the running task and the waiting task may be switched with each other more quickly. That is, when the latest slack disappearance time of the first running task is later than the earliest slack disappearance time of the first waiting task, the first running task switches from the running state to the waiting state and the first waiting task switches from the waiting state to the running state.

It should be noted that the present disclosure is not limited to the embodiment or the drawings. The present disclosure may be modified or expanded as follows. The running task and the waiting task may be controlled integrally without being separated. The present disclosure may be applicable to a microprocessor having four or more processor cores. Alternatively, the present disclosure may be applicable to a microprocessor having two processor cores or a single processor core.

According to a task scheduler described in the present disclosure, running states of the multiple tasks are controlled by a common time. A slack disappearance time S for each of the multiple tasks is calculated by the following expression:

$$S = T + D - W + C.$$

A task having the earliest slack disappearance time S is preferentially executed. The slack disappearance time corresponds to a time when a slack time of each of the tasks is disappeared. All tasks are controlled by the common time. When the task scheduling is performed to preferentially execute the task having the earliest slack disappearance time, a result of the scheduling is similar to a result obtained by a conventional task scheduling. In the conventional task scheduling, a task having the earliest slack time is preferentially executed.

In the present disclosure, the current elapsed time C is the only value that changes, and thus, only the slack disappearance time of the running task changes. The slack disappearance time of the waiting task does not change. The running states of the multiple tasks may be controlled based on the common time, and only the slack disappearance time S of the tasks, which are in the running state, may be updated. Thus, the task scheduler may be realized in the small scale circuit.

According to the task scheduler in the present disclosure, when the slack disappearance time of the new task is earlier than the latest slack disappearance time of the running task, the new task becomes a running task, and the running task having the latest slack disappearance time switches to the waiting task. When the slack disappearance time of the new task is later than the latest slack disappearance time of the running task, the new task becomes a waiting task. Based on a time order of the slack disappearance times, a task to be in a running state and a task to be in a waiting state are switched with each other. Since the slack disappearance time of the new task and the latest slack disappearance time of the running task are compared just once, scheduling may be performed quickly.

According to the task scheduler in the present disclosure, the running task and the waiting task may be controlled separately by using two task tables. That is, the running task may be controlled by a running task table, and the waiting task may be controlled by a waiting task table. Therefore, a comparison between the slack disappearance times for switching may be easily performed. According to the task scheduler in the present disclosure, the latest slack disappearance time of the running task is compared with the earliest slack disappearance time of the waiting task. When the earliest slack disappearance time of the waiting task is earlier than the latest slack disappearance time of the running task, the running task having the latest slack disappearance time switches to a waiting task (i.e., be in the waiting state), and the waiting task having the earliest slack disappearance time switches to a running task (i.e., be in the running state). Therefore, since the latest slack disappearance time of the running task and the earliest slack disappearance time of the waiting task are compared only once before the running task and the waiting task are switched, the task scheduling may be performed quickly.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A task scheduler scheduling one or more running units to execute a plurality of tasks, a total number of the plurality of tasks being greater than a total number of the one or more running units, the task scheduler comprising:
a processor, the processor is configured to
have, in a time control portion, a common time to control a state of the plurality of tasks;
calculate, by a task calculator, a slack disappearance time for each of the plurality of tasks; and
select, by a running task selector, a running task having a latest slack disappearance time from among the plurality of tasks, the plurality of tasks including (i) a new task occurring when a running request newly occurs, (ii) the running task being in a running state, and (iii) a waiting task being in a waiting state,
wherein
an arrival time of one of the plurality of tasks is defined as T,
a deadline time representing when the one of the plurality of tasks is required to be completed is defined as D,
a worst case execution time predicted to be required for a completion of the one of the plurality of tasks is defined as W,
a current elapsed time is defined as C,
the slack disappearance time is expressed by $S = T + D - W + C$,
a task having an earliest slack disappearance time from among the plurality of tasks is scheduled to be preferentially executed,
when the slack disappearance time of the new task is earlier than the latest slack disappearance time of the running task, the new task is executed and the running task having the latest slack disappearance time switches from the running state to the waiting state,
when the slack disappearance time of the new task is later than the latest slack disappearance time of the running task, the new task is in the waiting state, and
the current elapsed time of the one of the plurality of tasks increases when the one of the plurality of tasks is executed.

2. The task scheduler according to claim 1, wherein the running task and the waiting task are separately controlled by using task tables.

3. The task scheduler according to claim 2, further comprising
a waiting task selector selecting the waiting task having the earliest slack disappearance time, wherein
the latest slack disappearance time of the running task is compared with the earliest slack disappearance time of the waiting task, and
when the latest slack disappearance time of the running task is later than the earliest slack disappearance time of the waiting task, the running task switches from the running state to the waiting state and the waiting task switches from the waiting state to the running state.

4. The task scheduler according to claim 1, wherein
a slack disappearance time for a running task which has been executed at a specific time is defined as Sn,
a slack disappearance time that has been updated at an earlier time before the specific time is defined as Sp,
a current elapsed time that is counted up from the earlier time is defined as Ca, and $$Sn = Sp + Ca.$$

5. The task scheduler according to claim 1, wherein
the slack disappearance time of a new task is defined as Si, and $$Si = T + D - W.$$

6. The task scheduler according to claim 1, wherein
the plurality of tasks are sorted and controlled based on the slack disappearance time of each of the plurality of tasks.

7. A microprocessor comprising:
one or more running units, and
a task scheduler scheduling the one or more running units to execute a plurality of tasks, a total number of the plurality of tasks being greater than a total number of the one or more running units, the task scheduler including:
a time control portion having a common time to control a state of the plurality of tasks;
a task calculator calculating a slack disappearance time for each of the plurality of tasks;
a running task selector selecting a running task having a latest slack disappearance time from among the plurality of tasks, the plurality of tasks including (i) a new task occurring when a running request newly occurs, (ii) the running task being in a running state, and (iii) a waiting task being in a waiting state, wherein
an arrival time of one of the plurality of tasks is defined as T,
a deadline time representing when the one of the plurality of tasks is required to be completed is defined as D,
a worst case execution time predicted to be required for a completion of the one of the plurality of tasks is defined as W,
a current elapsed time is defined as C,
the slack disappearance time is expressed by $S = T + D - W + C$,
a task having an earliest slack disappearance time from among the plurality of tasks is scheduled to be preferentially executed, and
when the slack disappearance time of the new task is earlier than the latest slack disappearance time of the running task, the new task is executed and the running task having the latest slack disappearance time switches from the running state to the waiting state,
when the slack disappearance time of the new task is later than the latest slack disappearance time of the running task, the new task is in the waiting state, and
the current elapsed time of the one of the plurality of tasks increases when the one of the plurality of tasks is executed.

8. A task scheduling method scheduling one or more running units to execute a plurality of tasks, a total number of the plurality of tasks being greater than a total number of the one or more running units, the task scheduling method comprising:
managing, by a processor, a common time to control a state of the plurality of tasks;
calculating, by the processor, a slack disappearance time for each of the plurality of tasks; and
selecting, by the processor, a running task having a latest slack disappearance time from the plurality of tasks, the plurality of tasks including (i) a new task occurring when a running request newly occurs, (ii) the running task being in a running state, and (iii) a waiting task being in a waiting state, wherein
an arrival time of one of the plurality of tasks is defined as T,
a deadline time representing when the one of the plurality of tasks is required to be completed is defined as D,
a worst case execution time predicted to be required for a completion of the one of the plurality of tasks is defined as W,
a current elapsed time is defined as C,
the slack disappearance time is expressed by $S = T + D - W + C$, and
a task having an earliest slack disappearance time from among the plurality of tasks is scheduled to be preferentially executed,
when the slack disappearance time of the new task is earlier than the latest slack disappearance time of the running task, the new task is executed and the running task is in the waiting state,
when the slack disappearance time of the new task is later than the latest slack disappearance time of the running task, the new task is in the waiting state, and
the current elapsed time of the one of the plurality of tasks increases when the one of the plurality of tasks is executed.

9. The task scheduling method according to claim 8, wherein
the running task and the waiting task are separately controlled by task tables.

10. The task scheduling method according to claim 9, further comprising
selecting, by the processor, the waiting task having the earliest slack disappearance time, wherein
the latest slack disappearance time of the running task is compared with the earliest slack disappearance time of the waiting task, and
when the latest slack disappearance time of the running task is later than the earliest slack disappearance time of the waiting task, the running task switches from the running state to the waiting state and the waiting task switches from the waiting state to the running state.

11. The task scheduling method according to claim 8, wherein
a slack disappearance time for a running task which has been executed at a specific time is defined as Sn,
a slack disappearance time that has been updated at an earlier time before the specific time is defined as Sp,
a current elapsed time that is counted up from the earlier time is defined as Ca, and $$Sn = Sp + Ca.$$

12. The task scheduling method according to claim 8, wherein
the slack disappearance time of a new task is defined as Si, and $$Si = T + D - W.$$

13. The task scheduling method according to claim 8, wherein
the plurality of tasks are sorted and controlled based on the slack disappearance time of each of the plurality of tasks.

* * * * *